United States Patent Office 2,792,312
Patented May 14, 1957

2,792,312

CEMENT SLURRY FILTRATION

Eugene W. Geary, Zanesville, and Edgar C. Kreager, East Fultonham, Ohio, assignors to Pittsburgh Plate Glass Company No Drawing. Application March 19, 1953, Serial No. 343,498

3 Claims. (Cl. 106—100)

This invention relates to the manufacture of Portland cement by the wet process and more particularly is concerned with improving the filterability of a cement slurry.

In the manufacture of Portland cement by the wet process a calcareous material such as limestone, marl, and shells or like material containing calcium carbonate and materials containing silica, alumina and iron, such as shale, sand, and clay, are ground together in aqueous suspension to form a slurry. This slurry is filtered, and the solid material is burned and the resulting clinker finely ground to form cement. Difficulty has been encountered in the filtration of the slurry, which contains particles ranging in size from about 200 mesh down to colloidal size. Because of the presence of colloidal particles, the slurry must be flocculated in order that filtration may be successfully carried out. Various proposals have been made in the prior art to avoid or minimize the difficulties encountered in filtration. One proposal was to omit the filtration entirely; see United States Patent 1,904,699. This has the obvious disadvantage of necessitating the use of excessive quantities of fuel for evaporation of the water of the slurry during or before calcination. Another proposal, disclosed in United States Patent 1,870,372, was to flocculate the slurry by addition of hydrated lime. This has been done with moderate success in some instances. However, lime has little or no beneficial effect in the presence of certain materials which cause deflocculation of the slurry, such as phosphates, tannates, and organic matter. Many of such materials are usually present.

It has been discovered that a readily filterable slurry can be obtained by the addition to the slurry of certain alkaline earth metal water soluble salts. Of especial value in this regard are the alkaline earth metal chlorides, such as calcium chloride and magnesium chloride. Other soluble alkaline earth metal salt, such as calcium nitrate may be used, however. These salts cause flocculation of the slurry even when deflocculating agents such as phosphates, tannates, and organic matter are present. Any phosphate in solution in the slurry, for example, is precipitated by the addition of a calcium salt, thus replacing the phosphate ion with an ion such as chloride or nitrate which does not tend to cause deflocculation.

The discovery that calcium chloride and like materials will achieve the results which accrue in performance of the present invention is quite surprising since many electrolytes are unsuitable for this purpose.

The following is given by way of example:

Ninety-four parts by weight of limestone, four parts of shale, and two parts of silica sand are mixed with sufficient water to form a slurry of about 65% solids and 35% water. A representative analysis of such a slurry is as follows:

| | Percent |
|---|---|
| $SiO_2$ | 13.64 |
| $Al_2O_3$ | 4.07 |
| $Fe_2O_3$ | 1.63 |
| CaO | 43.35 |
| MgO | 1.61 |
| Loss on ignition | 35.70 |

Calcium chloride in about 0.1 to 0.2% based upon the weight of the dry solids of the slurry is added to the slurry, thereby causing the flocculation herein contemplated. Usually this amount is 0.1% to 0.2%, rarely above 0.5% and rarely below 0.05% by weight of the dry solids. Higher amounts may be used without harmful effect so long as the concentration is below that at which calcium chloride causes excessive fluxing. Such excessive fluxing generally occurs when the calcium chloride or like salt concentration is above about 1 to 2%. The slurry is filtered and the filter cake burned in the usual manner to form cement.

The above example is representative and is not given by way of limitation. Magnesium chloride, calcium nitrate, calcium bromide, magnesium bromide, or other soluble alkaline earth metal salt having substantially equivalent properties usually having a water solubility of at least 5 to 10 grams per 100 milliliters of water may be used instead of calcium chloride.

Cement consists primarily of lime and contains a smaller quantity of silica and still smaller quantities of alumina and ferric oxide.

The amount of the alkaline earth metal salt added should be adequate to flocculate the slurry. The exact amount of salt added depends on the amount of deflocculating agents present. Satisfactory results have been obtained by addition of enough alkaline earth metal salt to precipitate deflocculating material in solution and produce a hardness of 800 parts per million in the filtrate water. It is understood, however, that the hardness of the filtrate water may be varied within wide limits without departing from the scope of the invention.

The starting materials should be chosen so as to yield a cement of suitable composition. Cement consists primarily of lime, with a smaller quantity of silica and still smaller quantities of alumina and ferric oxide. For best results the ratio $$\frac{CaO}{SiO_2+Al_2O_3+Fe_2O_3}$$

is maintained close to 2.24 in the starting materials, although this ratio may range from 1.9 to 2.4. The ratio $$\frac{SiO_2}{Al_2O_3+Fe_2O_3}$$

may vary from 2 to 3, but should be kept within these limits for proper reaction and burning of the filter cake. Some limestones contain all the ingredients of cement in the proper proportions, and may be slurried without the addition of any other solid material. On the other hand, most limestones do not contain all the ingredients of cement, and it is necessary in those cases to add other substances, such as sand, clay, and shale to supply the ingredients not contained in the limestone. Thus, if a limestone which is substantially pure calcium carbonate is used, other solid materials must be mixed with the limestone to supply silica, alumina, and ferric oxide, and the weight of limestone will be only about 80% of the total weight of solids.

While the specific details of certain embodiments of the invention have been given by way of illustration, the invention is not deemed to be limited thereto except insofar as included in the accompanying claims.

What is claimed:

1. In the process of preparing Portland cement, wherein the components are ground to form a wet slurry, the slurry is filtered and the filter cake burned to form a clinker, the improvement which comprises facilitating filtration by adding to the slurry a quantity of an alkaline earth metal halide sufficient to increase the filtration rate thereof but not in excess of 2 percent of the weight of solid components in the slurry.

2. A process according to claim 1 wherein the salt is calcium chloride.

3. A process according to claim 1 wherein the salt is magnesium chloride.

References Cited in the file of this patent

UNITED STATES PATENTS

| | | |
|---|---|---|
| 394,663 | Rigby | Dec. 18, 1888 |
| 449,510 | Williams | Mar. 31, 1891 |
| 866,376 | Meade | Sept. 17, 1907 |
| 1,186,522 | Ellis | June 6, 1916 |
| 1,870,372 | Maust | Aug. 9, 1932 |
| 1,964,685 | Folger | June 26, 1934 |
| 2,121,557 | Baernstein | June 21, 1938 |

FOREIGN PATENTS

| | | |
|---|---|---|
| 481,499 | Great Britain | Mar. 7, 1938 |

OTHER REFERENCES

Pages 544–547 of Transactions of the Ceramic Society of Great Britain, vol. 33, 1933–1934.

Article dealing with some experiments on frothed clays.

UNITED STATES PATENT OFFICE

CERTIFICATE OF CORRECTION

Patent No. 2,792,312

May 14, 1957

Eugene W. Geary et al.

It is hereby certified that error appears in the printed specification of the above numbered patent requiring correction and that the said Letters Patent should read as corrected below.

Column 2, line 10, for "in about 0.1 to 0.2%" read --in amount 0.1 to 0.2%--.

Signed and sealed this 14th day of January 1958.

(SEAL)
Attest:
KARL H. AXLINE

Attesting Officer

ROBERT C. WATSON
Commissioner of Patents